US007228319B1

(12) United States Patent
Fuchs

(10) Patent No.: US 7,228,319 B1
(45) Date of Patent: Jun. 5, 2007

(54) FILE COMPARISON OF LOCALLY SYNCHED FILES

(75) Inventor: Christian Fuchs, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 515 days.

(21) Appl. No.: 10/334,594

(22) Filed: Dec. 30, 2002

(51) Int. Cl.
 *G06F 17/00* (2006.01)
(52) U.S. Cl. .................. 707/204; 707/203; 707/102; 707/3
(58) Field of Classification Search ........ 707/202–204, 707/100–102, 10, 3–7; 717/1
See application file for complete search history.

(56) References Cited

U.S. PATENT DOCUMENTS

| | | | | |
|---|---|---|---|---|
| 6,199,076 | B1 * | 3/2001 | Logan et al. ............ | 715/501.1 |
| 6,401,239 | B1 * | 6/2002 | Miron ..................... | 707/203 |
| 6,643,652 | B2 * | 11/2003 | Helgeson et al. ......... | 707/10 |
| 6,904,434 | B1 * | 6/2005 | Wallach et al. .......... | 707/10 |
| 2002/0073080 | A1 * | 6/2002 | Lipkin .................... | 707/3 |

OTHER PUBLICATIONS

"TWiki™ —A Web Based Collaboration Platform" [online]. © 1999-2002. <http://twiki.sourceforge.net/>.
Cederqvist, et al., "Version Management with CVS for CVS 1.11. 2," © 1992, 1993 Signum Support AB, 85 pages.

The FreeBSD CVSweb Project, Aug. 2002, 2 pages, Retrieved from the Internet:<URL: http://web.archive.org/web/20020820013205/ http:/www.freebsd.org/projects/cvsweb.html.
H. Nordstrom, CVS log for cvsweb/README, Apr. 2001, 2 pages, Retrieved from the Internet:<URL: http://web.archive.org/web/ 20010418015806/http://stud.fh-heilbronn.de/~zeller/cgi/cvsweb. cgi/cvsweb/README.
Henner Zeller, cvsweb/, Dec. 2001, 1 page, Retrieved from the Internet:<URL: http://web.archive.org/web/20011216081036/ http://stud.fh-heilbronn.de/~zeller/cgi/cvsweb.cgi/cvsweb/.
H. Nordstrom, cvsweb/README—view—1.6, May 2000, 2 pages, Retrieved from the Internet:<URL: http://web.archive.org/web/ 20020102012249/http://stud.fh-heibronn.de/~zeller/cgi/cvsweb. cgi/cvsweb/README?rev=1.6&content-type=text/x-cvsweb-markup.

* cited by examiner

*Primary Examiner*—Sana Al-Hashemi
(74) *Attorney, Agent, or Firm*—Fish & Richardson P.C.

(57) ABSTRACT

Methods and apparatus, including computer program products, for a single keystroke file comparison tool. A first version of a file is downloaded from a repository to a client computer. An updated version of the file is downloaded from the repository to the client computer. State information for the file is stored. The state information specifies two versions of the file. In response to a single user input, a file comparison is performed on the file. The file comparison produces an output showing differences between the two versions specified by the state information for the file. The state information can be stored in a hyperlink that refers to the file. User input selecting the hyperlink invokes the file comparison on the file.

13 Claims, 6 Drawing Sheets

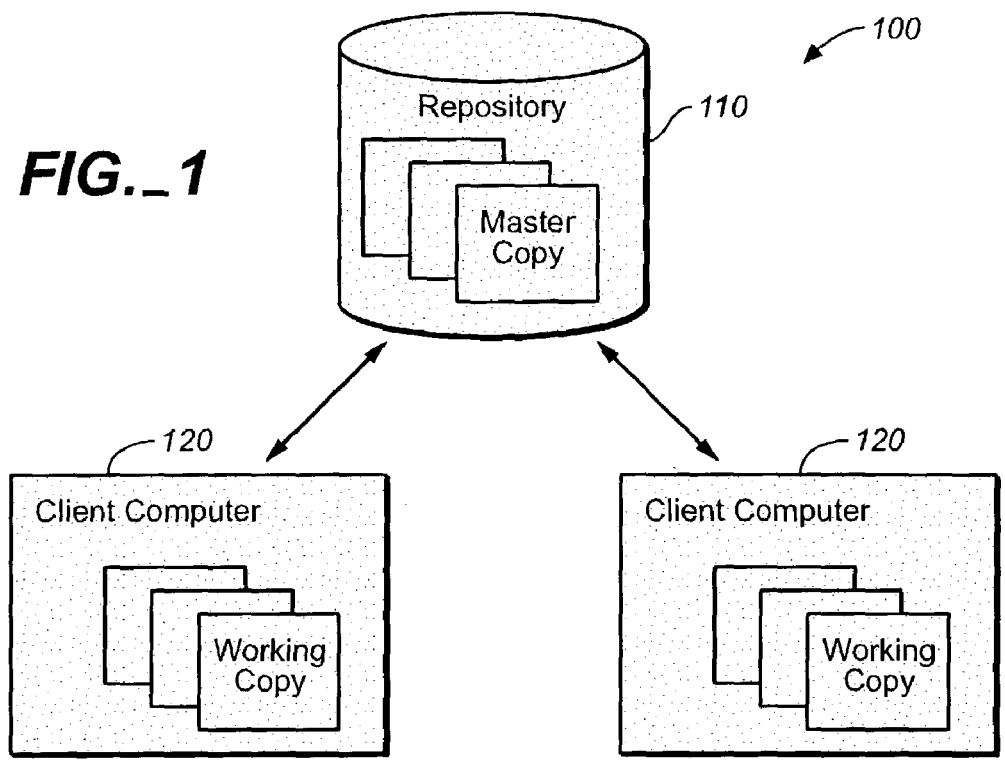
FIG._1
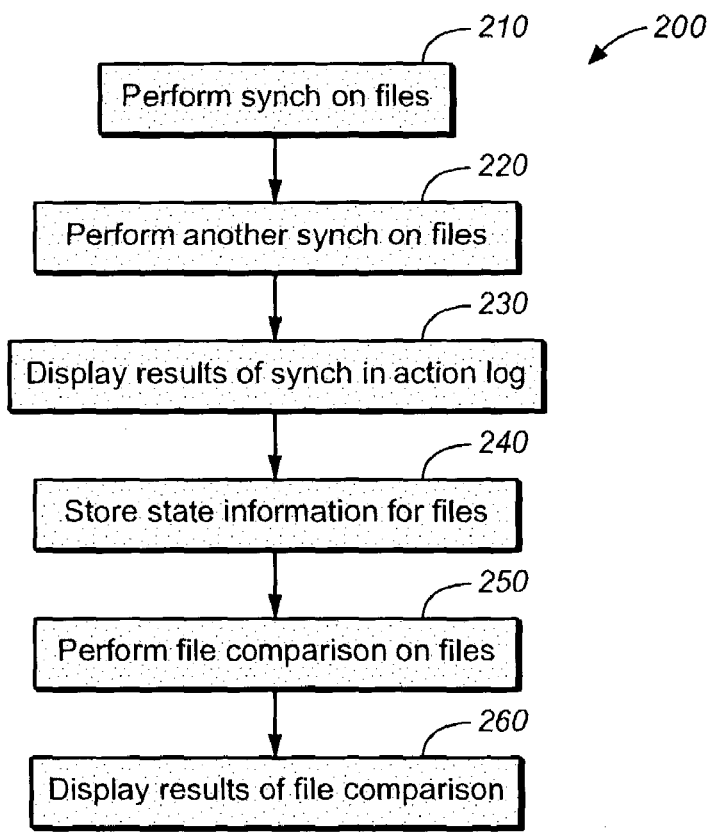
FIG._2

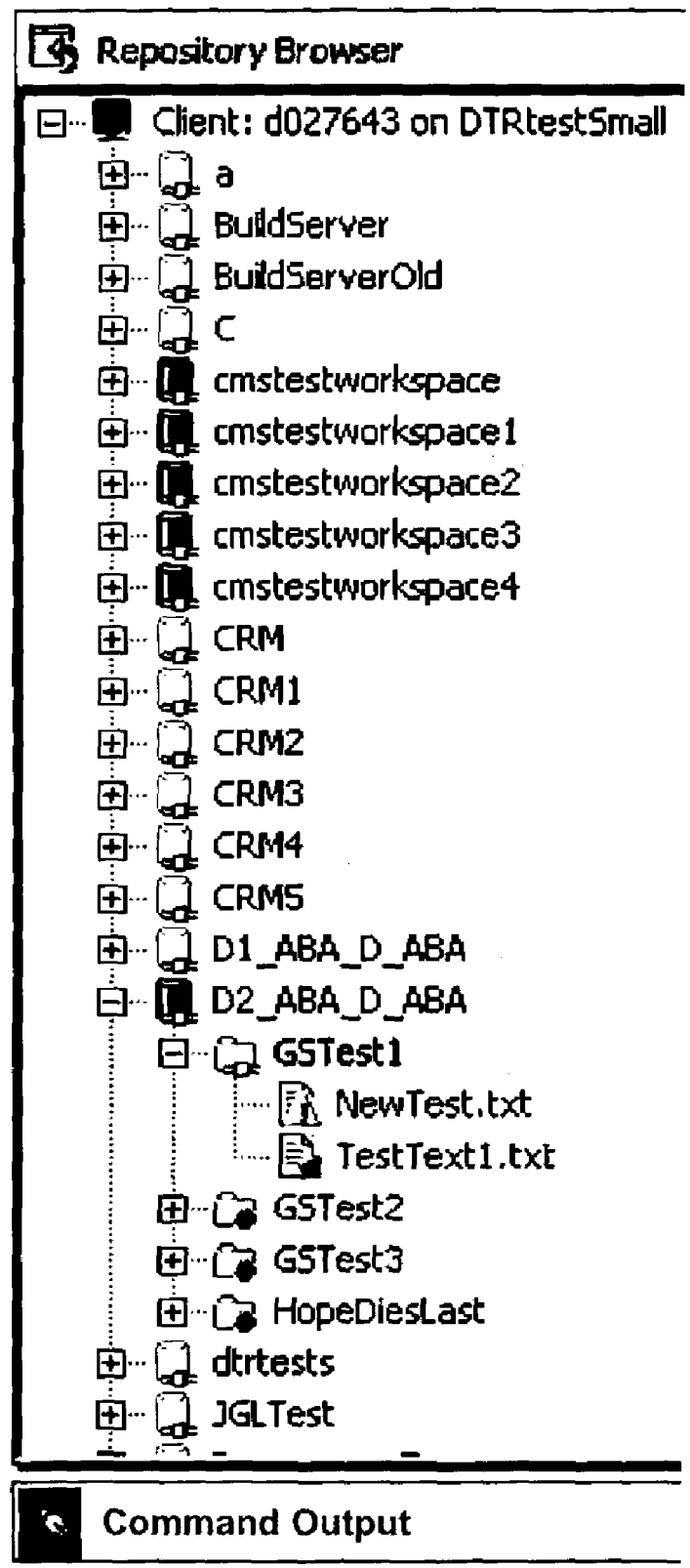
FIG._3

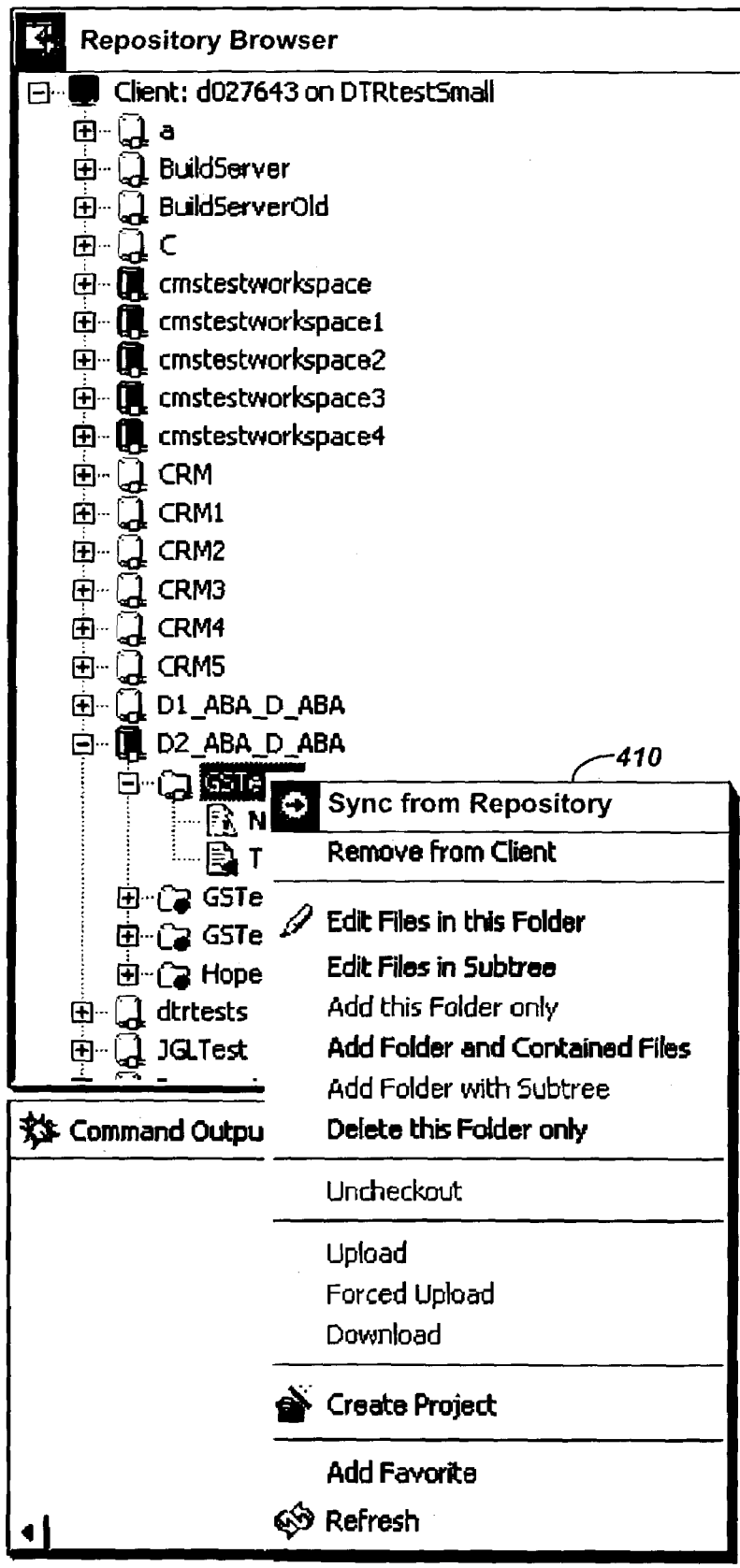
FIG._4

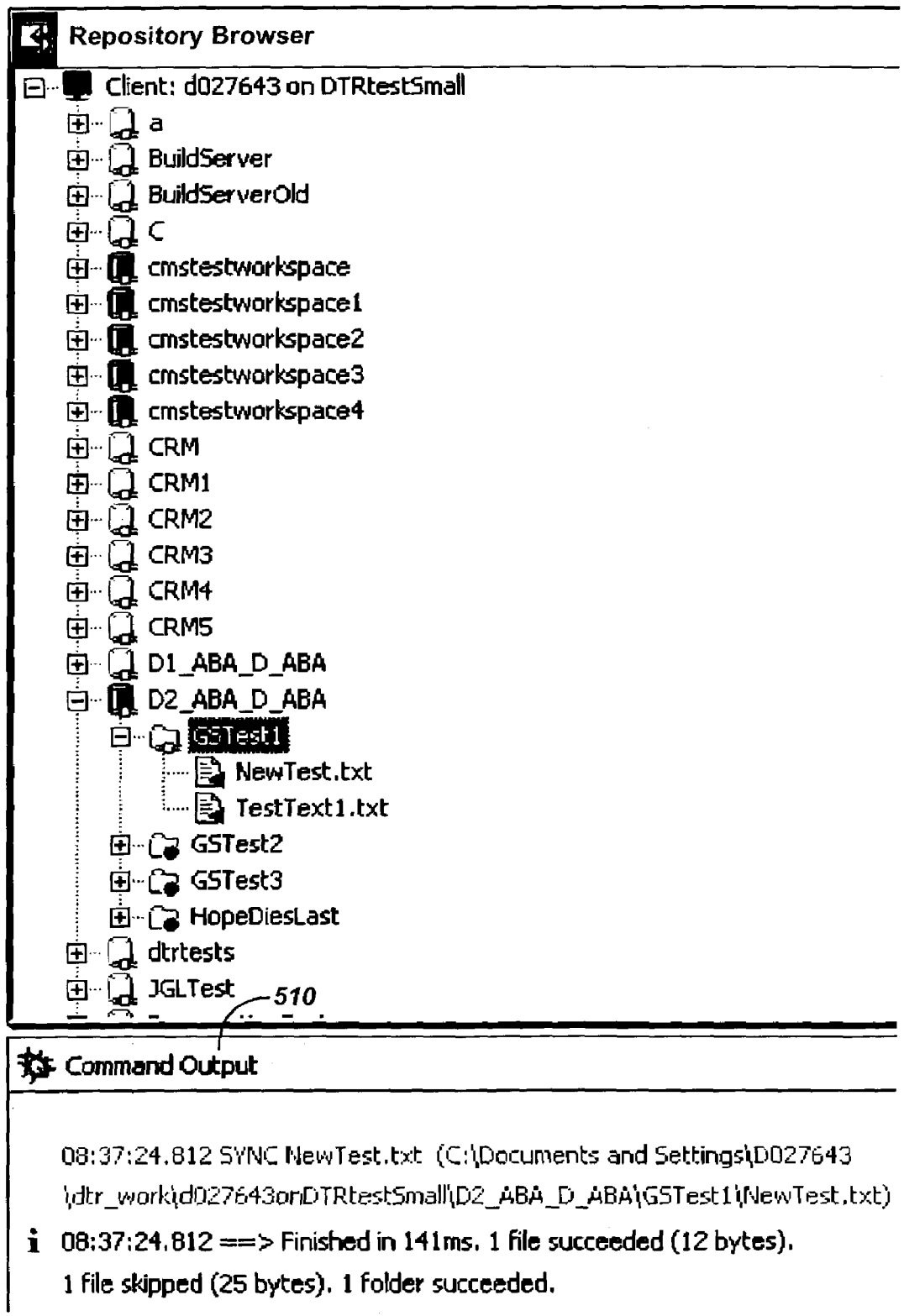
FIG._5

Repository Browser

- Client: d027643 on DTRtestSmall
  - a
  - BuildServer
  - BuildServerOld
  - C
  - cmstestworkspace
  - cmstestworkspace1
  - cmstestworkspace2
  - cmstestworkspace3
  - cmstestworkspace4
  - CRM
  - CRM1
  - CRM2
  - CRM3
  - CRM4
  - CRM5
  - D1_ABA_D_ABA
  - D2_ABA_D_ABA
    - GSTest1
      - NewTest.txt
      - TestText1.txt
    - GSTest2
    - GSTest3
    - HopeDiesLast
  - dtrtests
  - JGLTest

Command Output

08:37:24.812 SYNC NewTest.txt (C:\Documents and Settings\D027643 \dtr_work\d027643onDTRtestSmall\D2_ABA_D_ABA\GSTest1\NewTest.txt) — 610 i 08:37:24.812 ==> Finished in 141ms. 1 file succeeded (12 bytes).
  1 file skipped (25 bytes). 1 folder succeeded.

FIG._6

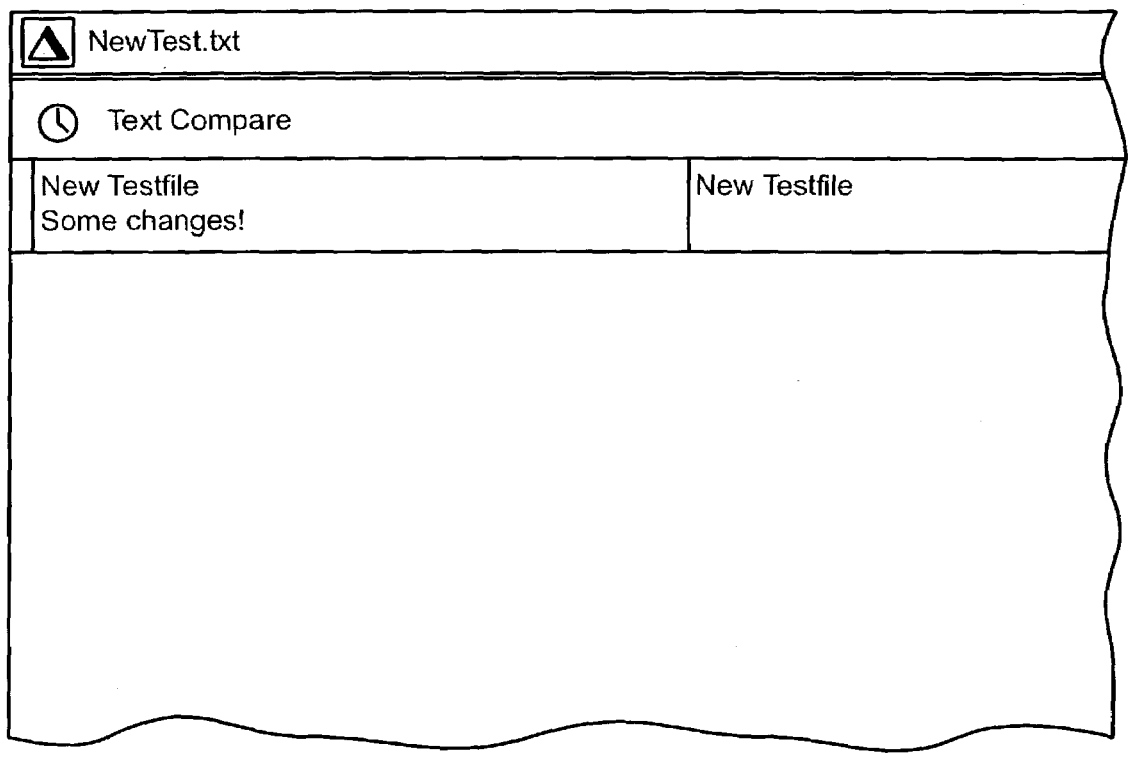
FIG._7
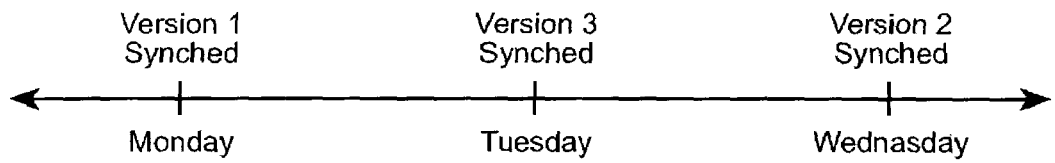
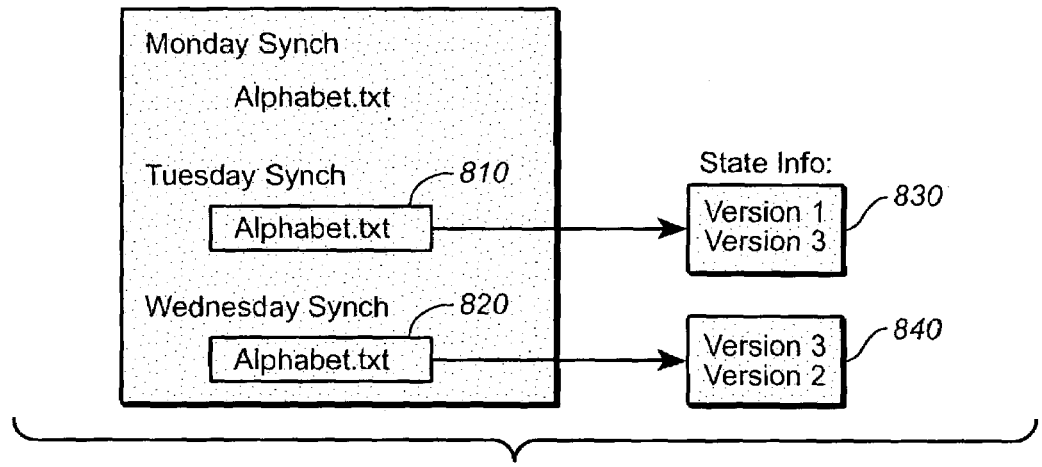
FIG._8

FILE COMPARISON OF LOCALLY SYNCHED FILES

BACKGROUND

This invention relates to digital data processing and, more particularly, to the use of file comparison tools.

A file comparison tool is a tool that determines differences between the content of two files. Each time the file comparison tool is invoked, a user must select the two files being compared. Thus, invoking a file comparison tool typically requires multiple keystrokes. A first keystroke is required to invoke the file comparison tool. A second and third keystroke is required to select each of the two files.

The file comparison tool can be used on files that are managed by a software configuration management (SCM) system. A SCM system manages source files for one or more software development projects. A developer can download a version of the files from the SCM system and later download an updated version of the previously downloaded files. A file comparison tool can be used to determine differences between the two downloaded versions.

SUMMARY

The present invention provides methods and apparatus, including computer program apparatus, for invoking file comparison on locally synched files.

In general, in one aspect, a computer-implemented method in accordance with the invention includes downloading a first version of one or more files from a repository to a client computer; downloading an updated version of one or more of the previously downloaded files from the repository to the client computer; storing state information for each updated file, the state information specifying two versions of the updated file; and in response to a single user input, performing a file comparison process on one of the updated files, the file comparison process producing an output showing differences between the two versions specified by the state information for the updated file.

Particular implementations can include one or more of the following features. The state information is stored in a hyperlink associated with the updated file. The hyperlink is displayed as part of the listing of the updated file in an action log. The action log is persistent. The file comparison process uses a user-selected or user-configured file comparison tool.

The invention can be implemented to realize one or more of the following advantages. The invention can reduce the number of keystrokes required to invoke a file comparison operation on two downloaded versions of a file. Clicking on a hyperlink associated with the file automatically invokes a file comparison operation on the two downloaded versions without requiring user input to select the two files. The user can configure different file comparison tools for different file formats.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 is a block diagram illustrating a software configuration management system.

FIG. 2 is a flow diagram illustrating protocol flow within the system.

FIG. 3 is a screen shot illustrating one example of a repository browser.

FIG. 4 is a screen shot illustrating one example of invoking a synch operation.

FIG. 5 is a screen shot illustrating one example of an action log.

FIG. 6 is a screen shot illustrating one example of a hyperlink that invokes a file comparison operation.

FIG. 7 is a screen shot illustrating one example of results of a file comparison operation.

FIG. 8 illustrates the contents of an action log for a hypothetical scenario.

Like reference symbols in the various drawings indicate like elements.

DETAILED DESCRIPTION

A software configuration management (SCM) system 100 manages source files for one or more software development projects. The system 100 includes a repository 110 and one or more client computers 120. The repository 110 is accessible to the client computers 120. The repository 110 can be a centralized repository located on a server that is remote to the client computers 120. Alternatively, the repository 110 can be located on one or more of the client computers 120.

For each source file, the system 100 maintains a master copy that is stored in the repository 110 and optionally, one or more working copies. The working copies are the copies in which the developers can make changes to the file. A working copy of the source files can be downloaded to a client computer 120 using a synch operation. The synch operation downloads the latest version of the files onto the client computer 120. In one implementation, the synch operation does not download a particular file if the latest version of that file already exists on the client computer 120.

The system 100 also maintains a version history of each source file. The version history includes multiple versions of the source file, each version capturing the state of the source file at a particular time during the development process.

These features of the system 100 can be implemented by conventional software configuration management techniques.

As shown in FIG. 2, a simplified protocol flow within the system 100 will be described. At the request of the developer, the system performs a synch operation on one or more files by downloading a working copy of the requested files onto the developer's computer 120 (210). The working copy reflects the current state of the master copy at the time the files are synched. The system 100 displays a list of the downloaded files in a repository browser as shown in FIG. 3.

While the files are checked out to the developer, the developer's working copy can become out-of-date with respect to the master copy of the files. At the request of the developer, the system 100 performs another synch operation on one or more of the previously downloaded files (220). As shown in FIG. 4, the developer can select files from the repository browser and then select a synch menu option 410 to invoke the synch operation on the selected files. In one implementation, the system performs the synch operation by comparing a last-modified timestamp of the working copy with the last-modified timestamp of the master copy and downloading an updated version of the file if the working copy is out-of-date with respect to the master copy.

The system 100 can display the results of the synch operation in an action log (230). As shown in FIG. 5, the action log 510 indicates which of the files were updated and when the update took place. The action log can be persistent. In other words, the action log can contain results for the most recent synch operation as well as results for prior synch operations.

The system 100 can store state information for each of the files that were updated during the synch operation (240). The state information for a file specifies two downloaded versions of the file, for example, the two most recently downloaded versions. The state information can be stored in a hyperlink associated with the file. The hyperlink can be displayed as part of the listing of the file in the action log or in the repository browser.

At the request of the developer, the system 100 can perform a file comparison operation on one or more of the files that were updated during the synch operation (250). A file comparison operation determines the difference between two files by comparing the content of the first file with that of the second file. The developer can invoke the file comparison operation on the two versions of the file by clicking on a hyperlink 610 displayed as part of the listing of the file in the repository browser or the action log, as shown in FIG. 6. Alternatively, the developer can invoke the file comparison operation by selecting the listing of the file in the repository browser or the action log and then selecting a file comparison button or menu option.

In an action log that is persistent, a file that has been synched multiple times can be listed multiple times in the action log. However, the hyperlink that is displayed with each listing of the file can contain different state information depending on which synch operation the listing corresponds with. For example, as illustrated in FIG. 8, suppose that a first version (Version 1) of a file, alphabet.txt, was downloaded on Monday. On Tuesday, a synch operation was performed on the file causing an updated version (Version 3) of the file to be downloaded. On Wednesday, another synch operation was performed on the file, causing another updated version (Version 2) to be downloaded.

In this example, a persistent action log would contain multiple listings of alphabet.txt. One listing 810 has a Tuesday timestamp and a hyperlink that contains state information 830 identifying Versions 1 and 3 of the file, which represent the two most recently downloaded files as of Tuesday. Another listing 820 has a Wednesday timestamp and a hyperlink that contains state information 840 identifying Versions 3 and 2 of the file, which represent the two most recently downloaded files as of Wednesday.

In response to the user input selecting the file, the system 100 performs the file comparison operation on the two versions of the file identified in the state information for the file. The developer does not need to select the two versions of the file manually. Instead, the system 100 automatically selects the two versions based on the state information for the file.

To perform the file comparison operation, the system 100 can invoke a file comparison tool that is provided by the developer or that is selected by the user. The developer can specify values for one or more configuration parameters of the selected file comparison tool. The configuration parameters can differ depending on the file format. The file comparison tool can be stored on the developer's computer 120 or elsewhere, for example, on a server. Any conventional file comparison tool can be used.

The system 100 can display the results of the file comparison operation to the developer (260). One example of how the diff results can be displayed is shown in FIG. 7.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, although the invention has been described in the context of a software configuration management system, the invention can be used in other document management contexts. Accordingly, other embodiments are within the scope of the following claims.

The invention claimed is:

1. A computer-implemented method, comprising:
   downloading during a first download a first version of one or more files from a repository to a client computer;
   downloading during a second download an updated version of one or more of the previously downloaded files from the repository to the client computer;
   storing state information for each updated file, the state information specifying two versions of the updated file;
   receiving user input selecting a file comparison tool; and
   in response to a single user input received after the second download, performing a file comparison process on one of the updated files, the file comparison process producing an output showing differences between the two versions specified by the state information for the updated file, wherein the file comparison operation is performed using the user-selected file comparison tool.

2. The method of claim 1, further comprising:
   receiving user input specifying one or more configuration parameters; and
   configuring the file comparison tool according to the one or more configuration parameters.

3. The method of claim 1, wherein storing state information for the updated file further comprises storing the state information in a hyperlink that refers to the updated file.

4. The method of claim 1, further comprising:
   displaying an action log that lists which files were updated during the second download; and
   displaying a hyperlink as part of the listing of the updated file in the action log, the hyperlink containing the state information for the updated file.

5. The method of claim 4, wherein the single user input includes a single keystroke selecting the hyperlink.

6. The method of claim 1, wherein:
   the updating step occurs more than once and at different times; and
   the action log indicates the updated files for each occurrence of the updating step.

7. The method of claim 1, wherein:
   for each updated file, the action log displays a timestamp indicating when the update occurred.

8. A tangible computer-readable medium, with instructions to cause a computer to perform steps comprising:
   downloading during a first download a first version of one or more files from a repository to a client computer;
   downloading during a second download an updated version of one or more of the previously downloaded files from the repository to the client computer;
   storing state information for each updated file, the state information specifying two versions of the updated file;
   receiving user input selecting a file comparison tool; and
   in response to a single user input received after the second download, performing a file comparison process on one of the updated files, the file comparison process producing an output showing differences between the two versions specified by the state information for the updated file, wherein the file comparison operation is performed using the user-selected file comparison tool.

9. The medium of claim 8, wherein storing state information for the updated file further comprises storing the state information in a hyperlink that refers to the updated file.

10. The medium of claim 8, further comprising instructions to cause a computer to perform steps comprising:
    displaying an action log that lists which files were updated during the second download; and
    displaying a hyperlink as part of the listing of the updated file in the action log, the hyperlink containing the state information for the updated file.

11. The medium of claim 10, wherein the single user input includes a single keystroke selecting the hyperlink.

12. The medium of claim 8, wherein:
    the updating step occurs more than once and at different times; and
    the action log indicates the updated files for each occurrence of the updating step.

13. The medium of claim 8, wherein:
    for each updated file, the action log displays a timestamp indicating when the update occurred.

* * * * *